United States Patent [19]

Jacobs et al.

[11] Patent Number: 4,518,312

[45] Date of Patent: May 21, 1985

[54] DUAL FOLD TAIL VANE ASSEMBLY FOR WIND ENERGY SYSTEMS

[75] Inventors: Marcellus L. Jacobs; Paul R. Jacobs, both of Fort Myers, Fla.

[73] Assignee: Jacobs Wind Electric, Plymouth, Minn.

[21] Appl. No.: 473,150

[22] Filed: Mar. 7, 1983

[51] Int. Cl.³ .............................................. F03D 7/04
[52] U.S. Cl. ...................................... 416/13; 416/14; 416/32; 416/41
[58] Field of Search .................... 416/12–14, 416/9, 10, 32, 37, 40, 41 A, 140 R

[56] References Cited

U.S. PATENT DOCUMENTS

| 300,161 | 6/1884 | Taylor | 416/13 |
|---|---|---|---|
| 1,698,709 | 1/1929 | Bucklen et al. | 416/13 |
| 1,746,991 | 2/1930 | Bucklen | 416/16 X |
| 1,816,632 | 7/1931 | Bucklen | 416/32 X |
| 1,818,672 | 8/1931 | Bucklen | 416/13 X |
| 4,068,131 | 1/1978 | Jacobs et al. | 416/132 B X |
| 4,088,420 | 5/1978 | Jacobs et al. | 416/9 |
| 4,297,075 | 10/1981 | Jacobs et al. | 416/14 |
| 4,403,916 | 9/1983 | Skelskey | 416/14 |
| 4,439,105 | 3/1984 | Hohenemser | 416/41 X |

Primary Examiner—Everette A. Powell, Jr.
Attorney, Agent, or Firm—Edward L. Schwarz; Joseph A. Genovese

[57] ABSTRACT

An improvement of the device disclosed in U.S. Pat. No. 4,297,075 permits the propeller assembly of a wind energy system to swing in two directions, both left and right with respect to wind direction. The improvement includes a snubber assembly which has a plurality of springs mounted on a central bar.

4 Claims, 2 Drawing Figures

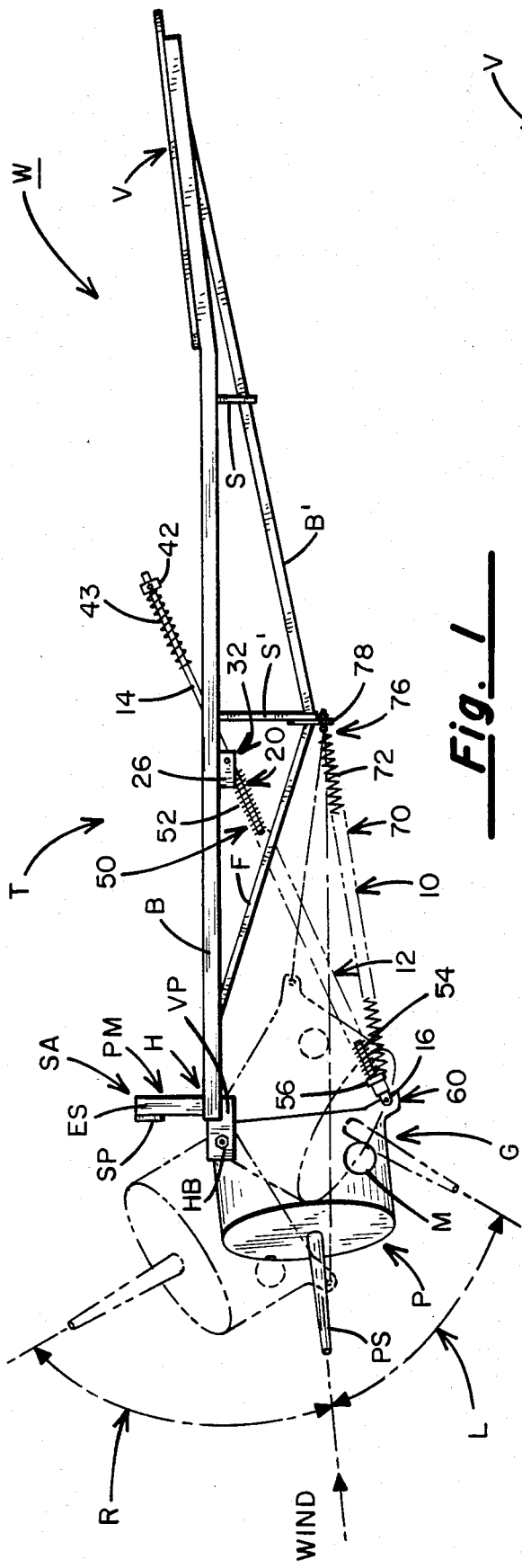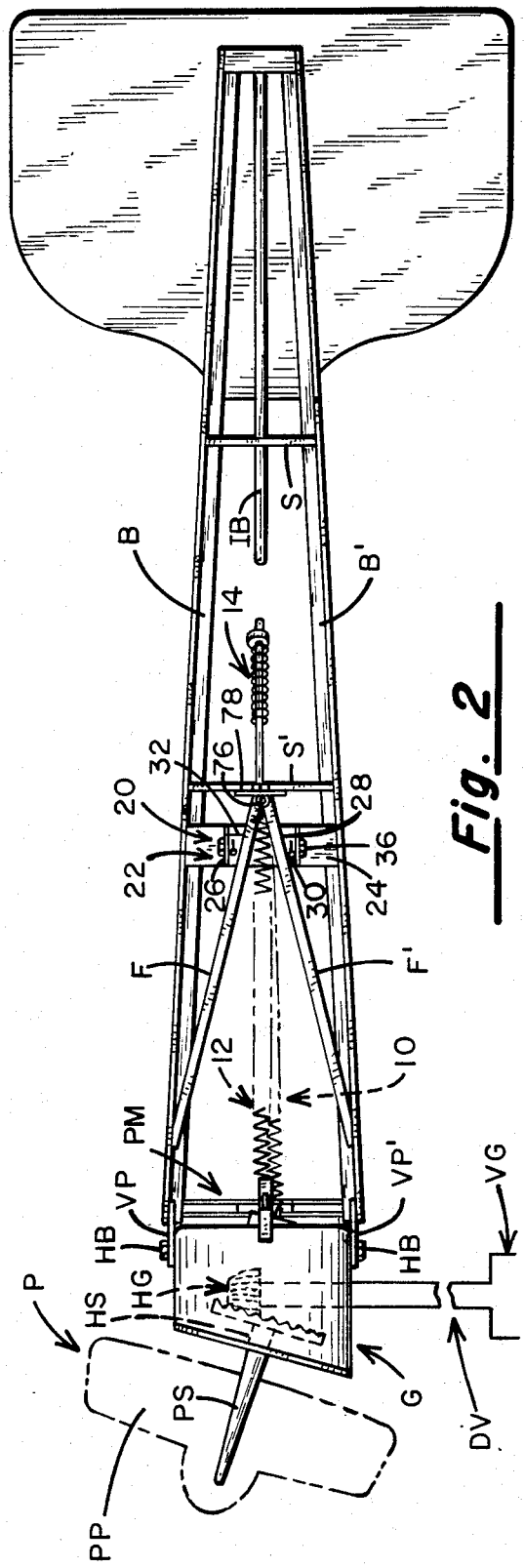

DUAL FOLD TAIL VANE ASSEMBLY FOR WIND ENERGY SYSTEMS

BACKGROUND OF THE INVENTION

The present invention relates in general to wind energy plants, and, more particularly, to storm protection of wind energy plants.

Changing the pitch, or angle, of air foil type propellers for speed regulation has long been in use for preventing overspeeding in normal winds and light storms. However, most of such governing devices, if they change the pitch sufficiently to prevent overspeeding in winds about 50 to 60 miles per hour, when the blade angle to the wind is increased beyond a certain point in order to prevent any further increase in speed, the outer portion of the propeller begins to act as a high speed centrifugal "paddle" fan. Back pressures of 100 miles per hour or more are thus created against the back portions of the propeller and this "back pressure" in turn allows tremendous pressure buildup against the front side of the revolving propellers, often breaking them as well as subjecting the entire plant and tower to severe storm damage. Winds exceeding 100 miles per hour are encountered at the tops of towers, and successful wind energy systems must be automatically controlled when such storms strike.

The inventors of the hereinafter disclosed invention also have patents relating to wind energy plants having the propeller axis offset from the vertical. Such patents include U.S. Pat. No. 4,068,131. Furthermore, the present inventors also have patents wherein the mast of a wind electric plant is offset from the center of the gear assembly, see, e.g., U.S. Pat. No. 4,088,420.

While the devices disclosed in the just-mentioned patents afford protection to the wind energy plant in storms wherein wind velocities do not exceed about 40 miles per hour, and are thus adequate under most conditions, there are storms in which wind velocites exceed 40 miles per hour, especially at the heights of the propellers of the wind energy power plants. As used herein, the term "high winds", or the like, will refer to wind velocities with respect to the wind energy plant of about 40 miles per hour and above. Even though such storms are rare in many areas, even the slimmest possibility of such a storm should be accounted for.

A drawback to those known wind energy power plants is that protection against high winds, that is, winds in excess of 40 miles per hour, is either not possible at all, or can be accomplished only at considerable expense. Accordingly, all known wind energy power plants either are not protected against high winds, or are protected inadequately, or are extremely expensive.

During storms, ice may form on the plant propeller blades creating a severe imbalance. The rotational velocities of the blades in a typical wind power plant are such that blade imbalance can set up severe vibrations in the plant. These vibrations can be serious enough to damage or even destroy a plant unless the plant is shut down. Known plants have no means of automatically shutting down the blades in a manner which, itself, does not present a possibility of damaging the plant. A shutdown which is too rapid may cause severe damage to the plant. As ice formation on propeller blades is a possibility in storms in many areas, and in some storms in all areas, complete storm protection for wind energy plants should account for this contingency.

Yet a further drawback to such plants is the uncontrolled manner in which manual shutdown can be effected. If the manual shutdown is not controlled properly, it is possible for an operator, either through inexperience or panic, or the like, to shut down the plant too rapidly in a storm condition, thereby causing the plant to be severely damaged, if not destroyed, due to the wind pressure placed on the blades as they slow down. Thus, complete storm protection for a wind energy plant should provide control over manual shutdown so that operation also is protected.

The inventors of the presently disclosed device also have a patent on an automatic storm protection system which overcomes the above-discussed drawbacks. The just-mentioned patent is U.S. Pat. No. 4,297,075, and the disclosure of such patent is incorporated herein by reference thereto.

It is also known that wind energy plants that use bevel gears to transfer power from a horizontal propeller driven shaft to a vertical drive shaft have a problem of the torque action rotating the horizontal shaft gear around the vertical shaft gear when power is applied to the horizontal shaft by the propeller.

In the device disclosed in U.S. Pat. No. 4,088,420, the disclosure of which is incorporated herein by reference thereto, the horizontal propeller hub shaft is offset several inches to the right side (viewed facing upwind, e.g., the starboard side) of the vertical drive shaft to create a lateral swing pressure against the gear case, that is, opposite the gear torque of the vertical shaft. Thus, the two opposing forces act to offset each other and the propellers of a wind electric plant which incorporate hypoid gear drives as disclosed in the just-referenced patent face directly forward into the wind when operating. U.S. Pat. No. 4,297,075 discloses the offset propeller hub principle in a wind electric plant to fold the propellers around to the right side in wind velocities above 30 miles per hour through a tail vane frame hinge system that operates against a tension spring. As used herein, the term "fold" implies yaw action of the propeller. The yaw action, or swing action, can only operate (yaw to the starboard side) in excess winds when the winding velocity (and hence wind pressure) exceeds that value required to deliver the predetermined amount of power to the vertical shaft (a wind speed of approximately 25 miles per hour). The folding action prevents excessive torque from being applied by the propeller to the vertical drive shaft in high winds or storms. The design disclosed in U.S. Pat. No. 4,297,075 only permits folding of the power head to the right (for high winds), and does not accommodate folding to the left, or port. Thus, the propellers in the U.S. Pat. No. 4,297,075 design face forward in full power position when the brake is applied.

When applying a brake to the vertical drive shaft to stop the propellers of a wind electric plant, the added brake torque (in addition to the power torque) keeps the propellers facing forward toward the wind, and when propeller speed is reduced, by the brake, an automatic variable blade pitch governor alters the blade pitch angle into full power position. This occurs in high winds, and makes it impossible to stop the plant. High winds can thus damage the brake and apply too much pressure to the propellers, bending them into the tower. For purposes of this disclosure, the term "high winds" implies wind velocities of 40 miles per hour or more, as stated hereinabove.

While the propellers in the U.S. Pat. No. 4,297,075 device will fold to the right under normal operation to prevent excessive wind pressure in storms, these propellers cannot be stopped because the added brake torque applied to the vertical drive shaft pulls the propellers back into an orientation facing the storm (even if those propellers are folded to the right), and when the propellers are slowed down by the brake, the governor action automatically changes the propellers from high storm pitch to a flat full power position even though the wind may be greater than 40 miles per hour. Storm pressure can thereby damage the plant.

SUMMARY OF THE INVENTION

The device embodying the teachings of the present disclosure is an improvement of the device disclosed in U.S. Pat. No. 4,297,075, and permits the propeller power head of a wind electric power plant to fold all the way around in both directions, that is, to the left as well as to the right. The device of the present disclosure improves the device disclosed in U.S. Pat. No. 4,297,075 by adding thereto the means for permitting propeller power head left yawing action. The propeller power head will fold to the left when a brake torque is applied, thereby allowing the propellers to be stopped by the brake with little wind force dragging them. The device of the present disclosure includes a stiffer spring on the brake folding side to keep the propellers facing directly forward for normal operation. The stiffer spring will only permit folding to the left, in the direction of vertical shaft torque, when the additional brake applied torque is added to the normal vertical drive shaft torque, thereby forcing the propeller power head to the left side and accomodating nearly all wind pressure.

The device of the present invention permits stopping the propellers in high winds. The vane is held in a normal (i.e., downwind) position by the double sets of springs. One spring subassembly controls the normal operating position of the power head, allowing it to fold to one side (to the right when viewed from the tail forward) whenever the wind velocity exceeds that required for maximum output. The other spring assembly controls the turning of the power head in the opposite direction (i.e., to the left when viewed from the tail forward) when the greater brake torque is applied or during storms when the vane must swing independant of the propeller power head to relieve strain on blades. This left turning control spring subassembly is stronger than the spring controlling the normal working power head (right turning) movement, because it is only activated when the brake is applied to stop the plant, thereby adding torque to that already present. The brake stopping torque is several times greater than the opposing power drive torque, thus forcing a left swing turn of the power head for stopping the plant.

OBJECTS OF THE INVENTION

It is the main object of the present invention to improve upon the device disclosed in U.S. Pat. No. 4,297,075 by permitting a propeller head of a wind electric plant to fold all the way around in both directions.

It is another object of the present invention to permit a brake of a wind electric power plant to be applied in high wind conditions.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a top plan view of a portion of a wind electric power plant embodying the teachings of the present invention.

FIG. 2 is an elevation view of the device shown in FIG. 1.

DETAILED DESCRIPTION OF THE INVENTION

Shown in the figures is a top portion of a wind energy electric plant W. The plant includes a tail section T having an axis running horizontally in both FIGS. 1 and 2 along the long dimension, a gear assembly G and a propeller assembly P. The gear assembly and the propeller assembly comprise a power head, and a substantially horizontal propeller driven shaft PS forms part of the horizontal drive or input shaft HS which is connected to a vertical drive or input shaft DV by the hypoid gear drive system HG disclosed in U.S. Pat. No. 4,088,420. The vertical shaft DV supports the gear assembly G and transfers power to a generator VG having a vertically upwards projecting shaft as fully disclosed in the referenced patents. As is also fully disclosed therein, the entire gear assembly G and propeller assembly P can pivot about vertical output shaft DV so as to always face upwind. In FIG. 1, the intersection M of the projection of the output shaft DV with the gear case of gear assembly G is shown in various positions pivoted relative to tail assembly T and gear assembly G.

The tail section includes a plurality of main braces such as braces B and B', and a plurality of vertical struts such as struts S and S', plus a plurality of bracket frame spanners such as F and F'. A rear tail vane V is attached at one end of the tail section, and the gear assembly G is attached to the other end of the tail assembly. An intermediate brace IB extends from strut S' rearwardly of the tail assembly and is attached to the rear tail vane.

As described in the U.S. Pat. No. 4,297,075, the gear assembly is pivotably attached to the tail section via hinge means H which includes mounts VP and VP' attached to the tail section and to the gear assembly by hinge bolts, such as bolt HB. A hinge stop means PM extends between the mounts and the gear assembly, and the gear assembly G pivots about the hinge bolts HB with respect to the tail assembly T in the starboard yaw direction R shown in FIG. 1 to swing out of the wind as described in the referenced U.S. Pat. No. 4,297,075. A stop arm assembly SA includes a stop arm ES and a stop arm pad SP against which the gear assembly abuts during the swinging motion R.

Propeller swing motion in the R sector is controlled by a first pivot control means comprising the snubber spring assembly 10, and including a right folding control extension spring 72. The gear assembly normally faces directly forward and swings to the right, i.e., into sector R, whenever wind speeds exceed 35 to 40 miles per hour, thereby preventing excessive pressure against the propeller PP.

A spring subassembly 12 includes a central bar 14 attached at one end thereof to a pivot pin 16 mounted on the gear assembly and has the other end thereof free. The bar is supported between the ends thereof by a mounting guide 20. The guide 20 is attached to the tail assembly by a mounting means 22 which includes a mounting base 24 affixed to the braces B and B', a pair of mounting plates 26 and 28 affixed to the base 24 by fasteners 30, and a U-shaped bracket 32 affixed to the mounting plates by mounting bolts, such as bolt 36. The subassembly 12 further includes a snubber spring 43 mounted on the central bar 14 and having one end thereof abutting a spring stop 42.

The subassembly 12 also includes a second pivot control means 50 which includes a long main compression spring 52 encircling the central bar 14 with one end thereof abutting the bracket 32. The main spring 52 controls propeller head port yaw as indicated by the reference indicator L in FIG. 1 against normal spring pressure. A snubbing spring 54 is also mounted on the central bar 14 and extends between one end of the main spring 52 and an adjustable spring stop 56. The spring stop is located adjacent to a pivot pin support means 60 in which the pivot pin 16 is located.

The snubbing spring 54 is a short, stiff spring that compresses only at the end of the left turning swing of the propeller power head. The snubbing spring 54 is stronger than the main spring 52 due to the requirement that the snubbing spring control propeller assembly port yaw motion during a braking action, which, as above discussed, adds torque to the torque already generated by the unit.

When the main spring 52 is fully compressed at the end of the left swing of the power head, this main spring applies added pressure to the stiffer short snubbing spring 54 to cushion the swing action of the power head as that power head is stopped at the end of the swing arc.

The spring assembly further comprises a third subassembly 70 which includes a right folding control spring 72 that maintains the propellers facing upwind as far as is necessary for full power output, and then permits a right folding action when wind speed exceeds a preset value so that full power output is maintained during high winds as the power head only folds enough to relieve excessive wind pressures. The sub-assembly 70 corresponds to the snubber assembly disclosed in the referenced U.S. Pat. No. 4,297,075.

The spring 72 is attached at one end thereof to strut S' by spring tension adjusting means 76 attached to a mounting plate 78 affixed to the strut S'. The spring tension adjusting means is used to assure that the spring 72 will maintain the power head in the proper orientation.

The main spring 52 is only activated (in normal use) when a brake is applied to create torsional drag on the output shaft DV to stop the plant. The U.S. Pat. 4,297,075 discusses various brakes, and attention is directed thereto. Application of a brake produces additional torsional drag on the plant vertical drive shaft, and this additional drag tends to force the propeller head around to the left allowing the propellers to be stopped without strain. Since left folding forces occur only when stopping the plant (except during storms), the main spring 52 is much stiffer than the right folding control spring 10. When the propeller head folds to the left (port yaw), as the brake is applied, the snubber spring 54 is compressed to act as a stop control for the maximum swing of the propeller head.

Another important feature of the action of the device disclosed herein is that it permits the vane to swing rapidly with violent wind shifts that occur during storms without placing rapid and excessive yawing pressure on the propeller hub and propellers. The propellers have centrifugal weights of thousands of pounds when they are operating (like a flywheel) and resist sudden changes in their facing directions. A vane can place damaging yaw pressures on hubs and propellers when being shifted in storms if rigidly attached to the propeller power head. This dual-fold design allows the vane to swing in a wide arc without applying excessive yaw pressures.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. An improvement in a means for protecting a wind energy plant against damage thereto caused in high winds, wherein the wind energy plant comprises:
    a generator supported with the shaft projecting vertically upwards;
    a hypoid gear drive means having a gear case, a substantially horizontal input shaft journaled in the gear case, an output shaft journaled in the gear case and whose axis is oriented vertically offset a predetermined distance from the input shaft axis, and a pair of hypoid gears, one of each carried by each shaft within the gear case in meshing engagement with each other for transferring power from the input to the output shaft, and said output shaft mounted concentrically on the generator shafts;
    a propeller assembly fixed on the input shaft to transfer wind generated torque to the input shaft, said propeller assembly including a variable pitch speed control governor for increasing the pitch of the propellers of said propeller assembly in response to increased propeller assembly speed in a manner such that propeller assembly speed does not exceed a predetermined maximum;
    a tail vane assembly having an axis running along its long dimension;
    pivot means pivotally connecting said gear case to the tail vane assembly about a vertical axis, said tail vane assembly being held with its axis substantially parallel to the wind direction by wind passing through the propellers, and further including a first pivot control means connected between the gear case and the tail vane assembly for providing a first predetermined resistance against pivoting by the gear case in a first direction with respect to the tail vane assembly, said pivoting force in the first direction being generated by the windage force on the propeller assembly directed parallel to the axis of the tail vane assembly and offset with respect to the output shaft axis; wherein the improvement comprises
    a second pivot control means connected between the gear case and the tail vane assembly for providing a second predetermined resistance against pivoting by the gear case opposite to the first direction with respect to the tail vane assembly, said second predetermined resistance being substantially greater than the first predetermined resistance, wherein the application during high winds of torsional drag to the output shaft of the gear drive sufficient to reduce the speed of the propeller assembly and thereby reduce feathering thereof increases wind generated propeller assembly torque on the gear drive input shaft sufficient to create reaction torque urging the gear case to pivot opposite the first direction relative to the tail vane assembly and exceed the windage-generated torque urging the gear case to pivot in the first direction relative to the tail vane assembly, and wherein said second pivot control means opposes the excess of said torque pivoting the gear case opposite to the first direction relative to the tail vane assembly.

2. The apparatus of claim 1, wherein the second pivot control means provides the second predetermined resistance against pivoting by the gear drive housing opposite to the first direction with respect to the tail vane assembly only when the axis of the input shaft is pivoted away from substantial alignment with the tail vane assembly axis and toward the direction opposite the first direction relative to the tail vane assembly.

3. The apparatus of claim 1, wherein said second pivot control means comprises a pivot control spring.

4. The apparatus of claim 3, further comprising a snubber spring stiffer than the pivot control spring and operatively connected thereto, to limit pivoting of the gear case in the direction opposite the first direction.

* * * * *